United States Patent [11] 3,625,898

[72] Inventors Ferdinand Clemens Maria Driessens
Nijmegen;
Henricus Francisous Johannes Ignatius Giller, Emmasingel, Eindhoven; Dirk Veeneman, Emmasingel, Eindhoven, all of Netherlands
[21] Appl. No. 856,187
[22] Filed Sept. 8, 1969
[45] Patented Dec. 7, 1971
[73] Assignee U.S. Philips Corporation
New York, N.Y.
[32] Priority Sept. 7, 1968
[33] Netherlands
[31] 6812815

[54] METHOD OF MANUFACTURING A CERAMIC, POLYCRYSTALLINE, MAGNETICALLY ANISOTROPIC SPINEL FERRITE BODY
9 Claims, No Drawings

[52] U.S. Cl. .................................................. 252/62.58,
23/51, 252/62.56, 252/62.59, 252/62.6,
252/62.61, 252/62.62, 252/62.64
[51] Int. Cl. ......................................................... C01g 49/00,
C04b 35/20
[50] Field of Search........................................... 252/62.56,
62.6, 62.61, 62.63, 62.14; 23/51

[56] References Cited
UNITED STATES PATENTS
3,015,788  1/1962  Sirvetz........................  252/62.56
3,072,575  1/1963  Gorter et al. ................  252/62.63

OTHER REFERENCES
Taft, " Alignment Techniques and Microwave Properties of Oriented Ferrimagnetic Cubic Material," Bulletin of American Ceramic Society, Vol. 47, No. 4, page 392 April 1968.

*Primary Examiner*—Robert D. Edmonds
*Attorney*—Frank R. Trifari

ABSTRACT: The manufacture of a ceramic, polycrystalline, magnetically anisotropic spinel ferrite bodies by sintering a mixture containing crystals of a compound $PbMe'''Fe_{16}'''O_{27}$ and/or of the compound $PbFe_{12}'''O_{19}$, the magnetic preferential axes or magnetic preferential planes of said crystals in said mixture being, to a certain extent, oriented mutually parallel, in which the above-mentioned spinel ferrite bodies are formed as the product of a topotactical reaction which mainly occurs according to the equation
$PbMe_2'AlFe_{16}'''O_{27} + 6Me''O$ 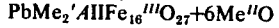
$6Me''Fe_2'''O_4 + 2Me'''Fe_2'''O_4 + PbO$ 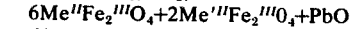
and/or according to the equation
$PbFe_{12}'''O_{19} + 6Me''O \quad 6Me''Fe_2'''O_4 + PbO$. 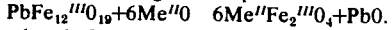
wherein $Me''$ and $Me'''$ both represent at least one (possibly all the same) representative of the group formed by the bivalent elements $Fe''$, $Ni''$, $Mn''$, $Co''$, Zn, Mg, $Cu''$ and the bivalent combination $(Li' + Fe''')/2$ and wherein $Fe'''$ may be partly replaced by Al and/or $Cr'''$ and/or at least one of the trivalent combinations $(Me'' + Ti^{IV})/2$ and $(Me'' + Sn^{IV})/2$.

METHOD OF MANUFACTURING A CERAMIC, POLYCRYSTALLINE, MAGNETICALLY ANISOTROPIC SPINEL FERRITE BODY

The invention relates to a method of manufacturing a ceramic, polycrystalline, magnetically anisotropic spinel ferrite body and to a spinel ferrite body manufactured by this method.

As is known, spinel ferrites have long been used extensively as magnetic core materials in electronic high-frequency apparatus. The term "spinel ferrites" refers to the materials that show the same (cubic) crystal structure as the mineral spinel, $MgAl_2O_4$. Very well-known spinel ferrites in the scope of the just-mentioned field of application are, for example, the nickel zinc ferrites (built up from mixed crystals of nickel ferrite, $NiFe_2O_4$, and zinc ferrite, $ZnFe_2O_4$) and the manganese zinc ferrites (build up from mixed crystals of manganese ferrite, $MnFe_2O_4$, and zinc ferrite). For some applications it is desirable to have polycrystalline spinel ferrite bodies available with a certain "texture," that is to say, polycrystalline spinel ferrite bodies in which the microcrystals are oriented mutually in a special manner. Such bodies are magnetically anistropic.

Polycrystalline, magnetically anisotropic nickel ferrite bodies were already described by G. P. Rodnique and L. A. Crouch in an article entitled "Linewidth Narrowing through Grain Orientation of Cubic Ferrites," see Journal of applied Physics, 37, pp. 923-925 (1966). These bodies were manufactured by compressing finely divided nickel ferrite, $NiFe_2O_4$, in a constant magnetic field which was oriented alternately in one of the other of two directions mutually enclosing an angle of 70°. They showed only a week magnetic orientation. Further reference is made to a statement "Alignment Techniques and Microwave Properties of Oriented Ferrimagnetic Cubic Materials" (D.R. Lapt, Bulletin American Ceramic Society, 47 (4), p. 392 (1968)). From this statement it appears that magnetically oriented, polycrystalline bodies obtained by the author and consisting of, for example, lithium ferrite, nickel ferrite, nickel cobalt ferrite and magnesium-manganese ferrite, in comparison with the corresponding magnetically unoriented bodies, show a reduced line width of the magnetic resonance, a reduced resonant field strength and a better rectangularity characteristic of the hysteresis loop.

Furthermore it was known already to manufacture polycrystalline, ferromagnetic bodies (including spinel ferrite bodies) with mutually oriented crystals by converting mutually magnetically oriented grains of a crystallized ferrite compound with a high axial magnetic crystal anisotropy with nonoriented grains of nonmagnetic compounds in a so-called "topotactical" reaction (see F. K. Lotgering, "Topotactical reactions with ferrimagnetic oxides having hexagonal crystal structures," I, Journal of Inorganic and Nuclear Chemistry, 9, pp. 113-123, Feb. 1959, and French Patent Specification No. 1,203,863, particularly the examples 21 and 22). However, this method of manufacturing also has so far had its objections and/or restrictions. When proceeding, for example, according to the just-mentioned example 21 of the French Patent Specification No. 1,203,863, according to which a finely divided mixture of 1 gram-molecule of $BaCo_2Fe_{16}O_{27}$(so-called "barium-cobalt-W") and 5 gram-molecules of cobalt carbonate, $CoCO_3$, is compressed in a rotating magnetic field at right angles to the direction of compression and is then sintered by heating at a temperature of 1,250° C., a polycrystalline body is formed during sintering according to the reaction.

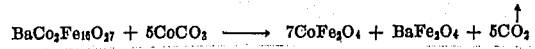

which body contains bariumferrite, $BaFe_2O_4$ as an impurity in addition to the mutually magnetically oriented crystals of cobalt ferrite, $CoFe_2O_4$. This impurity, an (undesirable) dilution of the active magnetic phase, cannot be removed from the sintered body without even more disturbing the texture thereof which is little pronounced as it is.

According to the prescription given in example 22 of the above-mentioned French Patent Specification No. 1,203,863 a finely divided mixture of 2 gram-molecules of cobalt ferrite, $CoFe_2O_4$, 1 gram-molecule of zinc oxide, ZnO, and 1 gram-molecule of iron oxide $Fe_2O_3$, is compressed in a linear DC magnetic field parallel to the direction of compression and then sintered by heating at a temperature of 1,300° C. A polycrystalline cobalt-zinc ferrite body is formed during the sintering according to the reaction equation.

The cobalt ferrite crystals form the magnetically orientable component of the starting mixture. As is known, these crystals have a comparatively high magnetic crystal anisotropy as compared with other spinel ferrite crystals. In practice, therefore, the field of application of the prescription according to the above-mentioned example 22 of the French Patent Specification No. 1,203,863 is restricted to the manufacture of polycrystalline bodies consisting of cobalt ferrite or of cobalt mixed ferrites having a rather high cobalt content.

The invention provides a method which enables the manufacture of polycrystalline, magnetically anisotropic spinel ferrite bodies of mutually very diverging compositions free from a contaminating second phase, while using the principle of the above-mentioned "topotactical" reaction. This method, in which is known manner start is made from a mixture which contains as one of the components of crystallized ferrite compound having axial or planar magnetic crystal anisotropy and in which the other component of the starting mixture is an oxide having a chemical composition according to the formula $Me''O$, wherein $Me''$ is at least one representative of the group formed by the bivalent elements $Fe''$, $Ni''$, $Mn''$, $Co''$, $Zn$, $Mg$, $Cu''$ and the bivalent combination $(Li^I+Fe^{III})/2$ which starting mixture is given the desired shape in such manner that the individual crystals of the ferrite compound having axial or planar crystals anisotropy are to a certain extent oriented parallel mutually with their easy axes of magnetization, after which the starting mixture which has thus been brought to the desired shape is sintered, is characterized in that the crystallized ferrite compound having axial or planar crystal anisotropy has a chemical composition according to the formula,

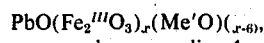

wherein $x$ is an even number exceeding 4 and smaller than 10 and $Me'''$ also is at least one representative of the group formed by the bivalent elements $Fe''$, $Ni''$, $Mn''$, $Co''$, $Zn$, $Mg$, $Cu''$ and the bivalent combination $(Li^I+Fe^{III})/2$.

When using the method according to the invention the formed ferrite compound is stable at the sintering temperature. Lead monoxide, PbO, is formed as a byproduct of the topotactical reaction and is liberated during sintering in vapor form and escapes. Surprisingly, the desired texture of the formed sintered bodies is not disturbed by the escape of the lead monoxide so that these bodies, in accordance with the degree of orientation of the crystal particles having axial or planar magnetic crystal anisotropy in the starting mixture, show a more or less strong magnetic anisotropy with the associated above-mentioned physical properties which are favorable for particular uses.

The starting mixture is preferably brought in the desired form of compressing it in a magnetic orienting field. However, the starting mixture, after the addition of a binder, may also be processed into plates, sheets, leaves, or strips by rolling or extrusion. Actually, the ferrite crystals having axial or planar magnetic crystal anisotropy have a strongly developed boundary surface at right angles to the direction of the easy axis of magnetization or parallel to the magnetic preferred plane so that the mutual parallel orientation, to some extent, of the easy axes of magnetization of the crystals can also be realized by means of mechanical forces instead of by means of magnetic forces, as is known per se, for example, from U.S. Pat. No. 2,999,275. The plates, sheets, leaves, strips obtained by rolling are then sintered after burning the binder.

According to the invention, very good results are obtained particularly by starting from a mixture in which the crystallized ferrite compound having axial or planar magnetic crystal anisotropy has a chemical composition according to the formula $$PbO \cdot (Fe_2^{III}O_3)_6(Me'^{II}O)_2,$$

wherein the symbol $Me'''$ again has the above-mentioned meaning. The use of the class of compounds defined by this formula (so-called "lead-W-compounds") as components of the starting mixture when using the method according to the invention permits obtaining a variety of polycrystalline magnetically anisotropic spinel ferrite bodies of a variety of chemical compositions in a simple manner and in a pure state.

Without departing from the scope of this invention, the $Fe^{III}$ in the crystallized ferrite compound having axial or planar magnetic crystal anisotropy may be replaced partly by at least one representative of the group formed by the trivalent elements $Al$, and $Cr^{III}$ and the trivalent combination $(Me^{II}+Me^{IV})/2$, wherein $Me^{II}$ has the above-defined meaning and $Me^{IV}$ is at least one of the elements $Ti^{IV}$ and $Sn^{IV}$. Furthermore, the other component of the starting mixture, i.e. the oxide having a chemical composition according to formula $Me^{II}O$, may be replaced fully or partly by one or more compounds which are converted into an oxide $Me^{II}O$ upon heating. As such components, for example, may be mentioned carbonates. The two just-mentioned types of replacements are generally known in another connection and hence form in themselves no part of the present invention.

Monocrystals of ferromagnetic spinel ferrites have four mutually equivalent easy axes of magnetization in the four directions at right angles to the planes of a regular octahedron, one of the basic forms of the cubic (or "regular") crystal system. The crystallographic indication for these directions is "lll" or $hhh$. By means of X-ray diffraction examination it can be established to what extent a certain texture is present in a given polycrystalline spinel ferrite body. For that purpose an X-ray diffraction pattern of the spinel ferrite body in question is compared with that of a textureless spinel ferrite body of the same composition and build up from the same type of crystals. In both cases a. the intensities of the four $hhh$ reflections;
the intensities of all reflections ($hkl$ reflections) including the $hhh$ reflections mentioned sub (a) are summed.

The sum of the intensities mentioned sub (a) are denoted by the symbol $\Sigma I_{(hhh)}$, those of the intensities mentioned sub (b) are denoted by the symbol $\Sigma I_{(hkl)}$ Introduced are now the quantities $p$ and $p_o$ which are defined as follows:

$$p = \frac{\Sigma I_{(hhh)}}{\Sigma I_{(hkl)}}, \text{ for the body to be tested for texture;}$$

$$p_o = \frac{\Sigma I_{(hhh)}}{\Sigma I_{(hkl)}}, \text{ for a texture-less body.}$$

As a measure of the texture of a given spinel ferrite body serves the so-called "directional factor," $f$, which is defined by the relationship $$f = (p-p_o)/(1-p_o)$$

For a body having a maximum texture ("ideally" directed body) it holds that $\Sigma I_{(hhh)} = \Sigma I_{(hkl)}$, that is to say $p=1$ and hence $f=1$, while, naturally, it holds for a textureless body that $p=p_o$, so $f=0$.

In order that the invention may be readily carried into effect a few samples thereof will now be described in greater detail.

EXAMPLE I

A mixture of $PbFe_{12}O_{19}$ and $NiO$ in a mutual ratio of 1 mol $PbFe_{12}O_{19}$ and 6 mol $NiO$ was ground in a vibrating mill with acetone for 2 hours. The component $PbFe_{12}O_{19}$ was present in this mixture in the form of magnetically orientable crystals having a magnetic preferred direction parallel to the hexagonal $c$-axis. The mixture was sieved while wet and a part of the formed slurry was compressed to a cylindrical tablet having a diameter of 35 mm. and a height of 15 mm. in a constant DC magnetic field having a field strength of 4,000 oersted parallel to the direction of compression at a pressure of 0.5 ton/sq.cm. (a DC magnetic field is to be understood to mean herein a magnetic field of which neither the direction nor the intensity varies). The tablet was dried, after-compressed isostatically at a pressure of 1,000 atmospheres, and heated for 4 hours at 1,250° C. in flowing oxygen which was supplied at a rate of 2 liters per minute. The course of the reaction occurring may be represented by the equation

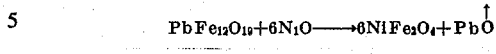

The gas current was sufficiently large to dissipate the PbO which evaporated during the reaction and to catch it in the cold part of the furnace. An X-ray diffraction pattern was made of the sintered tablet of a plane which extended at right angles to the direction in the tablet in which during compression, as a step of the manufacture of the tablet, compression was carried out. This direction in the tablet will hereinafter briefly be referred to as "direction of compression."

In substantially the same manner another tablet of nickel ferrite was prepared with the difference that during the preparation the treatment with a magnetic field was omitted. Of this tablet also an X-ray diffraction pattern was made of a plane at right angles to the direction of compression. By comparing the two patterns a value of 0.8 for the directional factor, $f$, of the first-mentioned tablet was found in the manner described above.

EXAMPLE II

Two tablets of the compound $Ni_{0.6}Mn_{0.4}Fe_2O_4$ were prepared from a mixture of $PbFe_{12}O_{19}$, $NiO$, and $MnCO_3$ in a mutual ratio of 1 mol $PbFe_{12}O_{19}$, 3.6 mol $NiO$ and 2.4 mol $MnCO_3$ in the manner described in example I by heating the mixture for 6 hours at a temperature of 1,320° C. in flowing nitrogen which was supplied at a rate of 2 liters per minute. The course of the reaction occurring may be represented by the equation

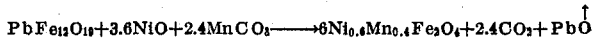

An X-ray diffraction pattern was made of each of the two tablets of a face at right angles to the direction of compression. By comparing the two patterns, a value of 0.6 was found for the directional factor, $f$, of the tablet during the manufacture of which a magnetic field was used during compression (with a field strength of 4,000 oersted).

EXAMPLE III

Two tablets of the compound $Ni_{0.9}Co_{0.1}Fe_2O_4$ were prepared in the manner described in example I from a mixture of $PbFe_{12}O_{19}$, $NiO$, and $CoCO_3$ in a mutual ratio of 1 mol $PbFe_{12}O_{19}$, 5.4 mol $NiO$ and 0.6 mol $CoCO_3$ by heating the mixture for 6 hours at a temperature of 1,260° C. in flowing oxygen which was supplied at a ratio of 2 liters per minute. The course of the reaction occurring may be represented by the equation

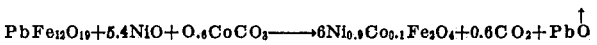

From the comparison of the two X-ray diffraction patterns it was found that the tablet during the manufacture of which a constant DC magnetic field (with a field strength of 4,000 oersted) was used during compression, showed a directional factor, $f$, of 0.5.

EXAMPLE IV

In substantially the same manner as described in example III, two tablets of the same composition were made in which the mode of preparation differed from that described in example III in that this time heating was carried out for 6 hours and at 1,320° C. in flowing nitrogen which was supplied at a rate of 2 liters per minute. This time a directional factor, $f$, of 0.8 was found for the tablet in which a texture is produced by the magnetic field treatment.

EXAMPLE V

Two tablets of the compound $Ni_{0.9}Mg_{0.1}Fe_2O_4$ were made in the manner described in example I from a mixture of $PbFe_{12}O_{19}$, NiO, and MgO in a mutual ratio of 1 mol $PbFe_{12}O_{19}$, 5.4 mol NiO, and 0.6 mol MgO by heating the mixture at a temperature of 1,320° C. for 6 hours in flowing oxygen which was supplied at a rate of 2 liters per minute. The course of the reaction occurring may be represented by the equation

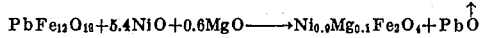
$$PbFe_{12}O_{19}+5.4NiO+0.6MgO \longrightarrow Ni_{0.9}Mg_{0.1}Fe_2O_4+Pb\overset{\uparrow}{O}$$

From the comparison of the two X-ray patterns it was found that the tablet during the manufacture of which a constant DC magnetic field (with a field strength of 4,000 oersted) was used during compression, showed a directional factor, $f$, of 0.8.

EXAMPLE VI

Two tablets of the compound $(Ni_{0.97}Co_{0.03})_{1.01}Fe_2O_4$ were made in the manner described in example I from a mixture of $PbFe_{12}O_{19}$, NiO, and $Co_3O_4$ in a mutual ratio of 1 mol $PbFe_{12}O_{19}$, 5.4 mol NiO, and 0.0606 mol $Co_3O_4$ by heating the mixture at a temperature of 1,300° C. for 4 hours in flowing oxygen which was supplied at a rate of 2 liters per minute. The course of the reaction occurring may be represented by the equation

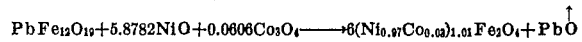
$$PbFe_{12}O_{19}+5.8782NiO+0.0606Co_3O_4 \longrightarrow 6(Ni_{0.97}Co_{0.03})_{1.01}Fe_2O_4+Pb\overset{\uparrow}{O}$$

For the tablet in which a texture was produced by the magnetic field treatment, a directional factor, $f$, of 0.8 was found in this case.

EXAMPLE VII

A mixture of $PbCo_2Fe_{16}O_{27}$ and NiO in a mutual ratio of 1 mol $PbCo_2Fe_{16}O_{27}$ and 6 mol NiO was ground in a vibrating mill for 2 hours with acetone. The component $PbCo_2Fe_{16}O_{27}$ was present in this mixture in the form of magnetically orientable crystals having a magnetic preferred plane at right angles to the hexagonal $c$-axis. The mixture was sieved while wet and a part of the slurry formed was compressed to a cylindrical tablet having a diameter of 35 mm. and a height of 15 mm. in a rotating magnetic field of 3 rotations per second and which extended at right angles to the direction of compression. The rotating magnetic field had a constant field strength of 3,600 oersted. The tablet was dried, after-compressed isostatically at a pressure of 1,000 atmospheres and heated at 1,250° C. for 6 hours in flowing oxygen which was supplied at a rate of 2 liters per minute. The course of the reaction occurring may be represented by the equation

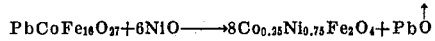
$$PbCoFe_{16}O_{27}+6NiO \longrightarrow 8Co_{0.25}Ni_{0.75}Fe_2O_4+Pb\overset{\uparrow}{O}$$

Another tablet was made from the same slurry but without the use of a magnetic field. An X-ray diffraction pattern was made of each of the tablets of a plane at right angles to the direction of compression. By comparing the two patterns a value of 0.9 was found for the directional factor, $f$, of the first-mentioned tablet.

EXAMPLE VIII

In substantially the same manner as described in example VII two tablets of the compound $Co_{0.25}Mn_{0.75}Fe_2O_4$ were made by heating a mixture of 1 mol $PbCo_2Fe_{16}O_{27}$ and 6 mol $MnCO_3$ at a temperature of 1,300° C. for 6 hours in flowing oxygen which was supplied at a rate of 2 liters per minute. The course of the reaction occurring may be represented by the equation

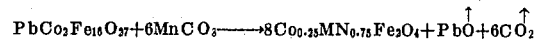
$$PbCo_2Fe_{16}O_{27}+6MnCO_3 \longrightarrow 8Co_{0.25}Mn_{0.75}Fe_2O_4+Pb\overset{\uparrow}{O}+6C\overset{\uparrow}{O}_2$$

An X-ray diffraction pattern was again made of each tablet of a plane at right angles to the direction of compression. By comparing the two patterns a value of 0.5 was found for the directional factor, $f$, of the tablet during the manufacture of which the magnetic rotating field was used.

EXAMPLE IX.

A mixture of $PbNi_2Fe_{16}O_{27}$ and CuO in a mutual ratio of 1 mol $PbNi_2Fe_{16}O_{27}$ and 6 mol CuO was ground in a vibrating mill with acetone for 2 hours. The component $PbNi_2Fe_{16}O_{27}$ was present in this mixture in the form of magnetically orientable crystals having a magnetic preferred direction parallel to the hexagonal $c$-axis. The mixture was sieved while wet and a part of the resulting slurry was compressed at a pressure of 0.5 ton/sq. cm. to a cylindrical tablet having a diameter of 35 mm. and a height of 15 mm. in a constant DC magnetic field having a field strength of 4,000 oersted parallel to the direction of compression. The tablet was dried and after-compressed isostatically at a pressure of 1,000 atmospheres. The tablet was then heated for 60 hours at a temperature of 1,150° C. in flowing oxygen which was supplied at a rate of 2 liters per minute. The course of the occurring reaction may be represented by the equation

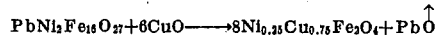
$$PbNi_2Fe_{16}O_{27}+6CuO \longrightarrow 8Ni_{0.25}Cu_{0.75}Fe_2O_4+Pb\overset{\uparrow}{O}$$

In substantially entirely the same manner another tablet was manufactured from the same slurry with the difference that during the manufacture of this second tablet the treatment with a magnetic field was omitted. Of this tablet also an X-ray diffraction pattern was made of a plane at right angles to the direction of compression. By comparing the two patterns a value of the direction factor, $f$, of 0.8 was found for the first mentioned tablet.

EXAMPLE X

In the same manner as described in example IX two tablets were prepared consisting of the compound $Zn_{0.25}Mn_{0.75}Fe_2O_4$ starting from a mixture of 1 mol $PbZn_2Fe_{16}O_{27}$ and 6 mol $MnCO_3$.

During the manufacture of both tablets heating was carried out for 6 hours at a temperature of 1,350° C. in flowing nitrogen which was supplied at a rate of 2 liters per minute. Of course of the reaction occurring may be represented by the equation

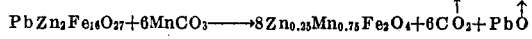
$$PbZn_2Fe_{16}O_{27}+6MnCO_3 \longrightarrow 8Zn_{0.25}Mn_{0.75}Fe_2O_4+6C\overset{\uparrow}{O}_2+Pb\overset{\uparrow}{O}$$

By comparing the two X-ray diffraction patterns a value of 0.50 was found for the directional factor, $f$, of the tablet during the manufacture of which the DC magnetic field was used.

EXAMPLE XI 65.5 parts by weight of a mixture of $PbFe_{12}O_{19}$ and NiO in a mutual ratio of 1 mol $PbFe_{12}O_{19}$ and 6 mol NiO was processed to a rollable mass with 24 parts by weight of a solution (consisting of 1 part by weight of polystyrene and 3 parts by weight of trichloroethane) and 4.8 parts by weight of tricresylphosphate. The trichloroethane was then removed by drying up the mass. The dried mass was rolled to form a film. This film was folded in the direction of rolling and rolled again which operation was repeated until a film with maximum texture was obtained (directional factor, $f$, between 0.6 and 0.8). A film manufactured in this manner was slowly heated to a temperature of 900° C. as a result of which the organic binder was burnt. Heating was then carried out for 4 hours at a temperature of 1,250° C. in flowing oxygen which was supplied at a rate of 2 liters per minute. A reaction took place, while sintering, the course of which may be represented by the equation

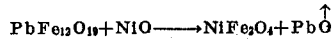

Another sintered body was manufactured from the same mass without rolling operation. An X-ray diffraction pattern was made of the first-mentioned sintered body of a plane parallel to the direction of rolling. An X-ray diffraction pattern was also made of an arbitrary plane of the second sintered body. By comparing the two patterns a value of the directional factor, $f$, of 0.3 was found for the first sintered body.

What is claimed is:

1. A method of manufacturing a ceramic, polycrystalline, magnetically anisotropic spinel ferrite body comprising the steps of forming a mixture of an oxide having a chemical composition according to the formula $Me''O$, wherein $Me''$ is at least one member of the group consisting of the bivalent elements $Fe''$, $Ni''$, $Mn''$, $Co''$, $Zn$, $Mg$, $Cu''$ and the bivalent combination $(Li^I + Fe^{III})/2$ and a crystallized ferrite compound having axial or planar magnetic crystal anisotropy and a chemical composition according to the formula $$PbO \cdot (Fe_2^{III}O_3) + (Me'''O)_{(x-6)},$$

wherein $x$ is an even number larger than 4 and smaller than 10 and $Me'''$ is at least one member of the group consisting of the bivalent elements $Fe''$, $Ni''$, $Mn''$, $Co''$, $Zn$, $Mg$, $Cu''$ and the bivalent combination $(Li^I + Fe^{III})/2$ in proportions forming upon heating a ferrite having a composition $Me''Fe_2O_4$, compacting said mixture into a desired shape in such a manner that the individual crystals of the ferrite compound having axial or planar magnetic crystal anisotropy are oriented mutually in parallel to a certain extent with their easy axes of magnetization or magnetic preferred planes, and thereafter sintering said mixture at a temperature between about 1,150° C. and 1,350° C. for a time sufficient to form the ferrite body.

2. A method as claimed in claim 1, wherein the mixture is compacted in a magnetic directional field.

3. A method as claimed in claim 1, wherein the mixture is admixed with a binder and rolled or extruded into plates, sheets, leaves, or strips, after which the binder is burned and the plates, sheets, leaves, or strips are sintered.

4. A method as claimed in claim 1, wherein the crystallized ferrite compound having axial or planar magnetic crystal anisotropy has a chemical composition according to the formula $PbO \cdot (Fe_2^{III}O_3)_8(Me'IIO)_2$.

5. A method as claimed in 1 wherein the $Fe^{III}$ in the crystallized ferrite compound having axial or planar magnetic crystal anisotropy is partially replaced by at least one member of the group consisting of the trivalent elements $Al$ and $Cr^{III}$ and the trivalent combinations $(Me'' + Me^{IV})/2$, wherein $Me''$ is defined in claim 1 and $Me^{IV}$ is at least one of the elements selected from the group consisting of $Ti^{IV}$ and $Sn^{IV}$.

6. A method as claimed in claim 4 in which the crystallized ferrite compound if $PbFe_{Fe_{12}}O_{19}$.

7. A method as claimed in claim 4 in which the crystallized ferrite compound is $PbCo_2Fe_{16}O_{27}$.

8. A method as claimed in claim 4 in which the crystallized ferrite compound is $PbNi_2Fe_{16}O_{27}$.

9. A method as claimed in claim 4 in which the crystallized ferrite compound is $PbZn_2Fe_{16}O_{27}$.

* * * * *